Sept. 15, 1925.
A. W. CAPS
1,553,980
CAMERA AND SIMILAR PHOTOGRAPHIC APPARATUS
Filed May 18, 1923
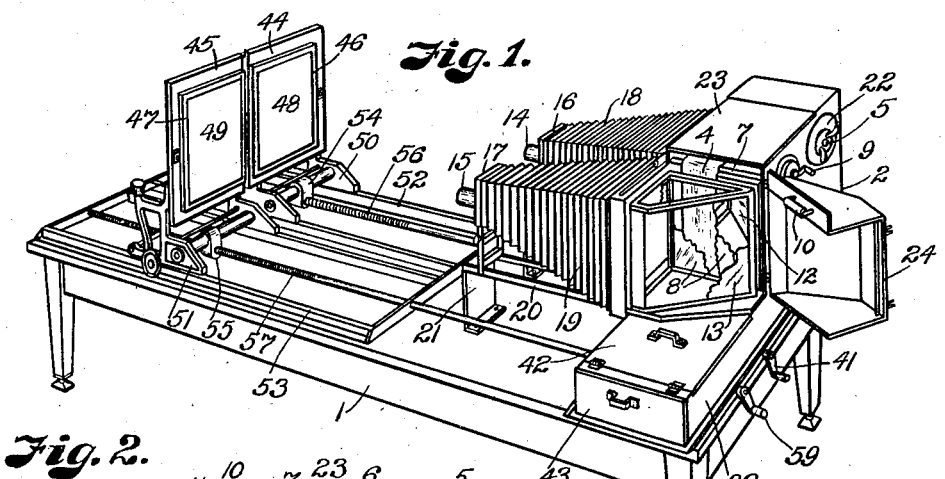
INVENTOR
Arthur W. Caps.
BY
ATTORNEY Patented Sept. 15, 1925.

1,553,980

UNITED STATES PATENT OFFICE.

ARTHUR W. CAPS, OF KANSAS CITY, MISSOURI, ASSIGNOR, BY MESNE ASSIGNMENTS, TO PHOTOSTAT CORPORATION, OF PROVIDENCE, RHODE ISLAND, A CORPORATION OF RHODE ISLAND.

CAMERA AND SIMILAR PHOTOGRAPHIC APPARATUS.

Application filed May 18, 1923. Serial No. 639,873.

*To all whom it may concern:*

Be it known that I, ARTHUR W. CAPS, a citizen of the United States, residing at Kansas City, in the county of Jackson and State of Missouri, have invented new and useful Improvements in Cameras and Similar Photographic Apparatus, of which the following is a specification.

The present invention relates to improvements in photographic cameras and similar apparatus, and more particularly to cameras or photographic machines of the general class shown and described in Letters Patent No. 929,757, granted August 3, 1909, and adapted for the production of photographic prints from photographic paper or similar material which is exposed and then mechanically developed and fixed.

The primary object of the present invention is to provide a duplex camera or photographic machine wherein the images from separate objects are individually focused on the opposite sides of a sheet of photographic paper or similar material which has been sensitized on both sides, thereby enabling pictures or copies of originals to be obtained in the desired sizes on the opposite sides of a single sheet. Another object is to provide a divided copy board or holder for use in conjunction with a duplex camera or photographic machine whereby objects or original copies of various sizes may be photographed or reproduced through separate lenses, so that the reproductions are of the same size on the opposite side of the sheet.

To these and other ends, the invention consists in certain improvements and combinations and arrangements of parts, all as will be hereinafter more fully described, the features of novelty being pointed out particularly in the claims at the end of the specification.

In the accompanying drawing:—

Figure 1 is a perspective view of a duplex camera or photographic machine constructed in accordance with the present invention;

Figure 2 represents a section through the machine taken on the line 2—2 of Figure 3; and Figure 3 represents a horizontal section on the line 3—3 of Figure 2.

Similar parts are designated by the same reference characters in the several views.

Duplex cameras or photographic machines embodying the present invention are applicable to various uses where a large number of copies of photographic reproductions are desired, they being particularly suitable for the photographic reproduction of documents, records and the like, the reproductions being either of the same size as the original or larger or smaller as may be desired. The preferred embodiment of the invention is shown in the accompanying drawing and will be hereinafter described in detail. It is to be understood, however, that the invention is not restricted to the precise construction shown, as equivalent constructions are contemplated and these will be included within the scope of the claims.

In the present instance, the machine comprises preferably a table 1 which may be composed of any suitable material, preferably sheet metal, and serves to support the various parts of the machine which comprises generally a copy holder to support the objects or original copies to be photographed and the camera in which the photographic paper or material is exposed, developed and fixed.

The camera comprises a casing 2 having a compartment 3 therein to receive a supply of photographic paper or sensitized material, the photographic paper being preferably supplied in the form of a roll 4, which is adapted to be mounted in the compartment 3 by a shaft 5, the end of the photographic paper, which is sensitized on both sides, passing from the compartment 3 over a guide or roller 6 and thence over and around a roller 7, the paper then passing downwardly through a passageway formed between a pair of suitably spaced clear glass plates 8 which define the focal plane of the camera. The roller 7 extends to the outside of the camera casing and may be provided with a crank or handle 9 by which it may be turned, a tensioning or pressure roller 10 which is pressed toward the feed roller 7 by a spring 11 serving to produce the requisite pressure on the photographic paper to insure its feeding when the feed roller 7 is rotated in the proper direction. At opposite sides of the glass plates 8 are located mirrors or reflectors 12 and 13, these mirrors or reflectors being arranged at angles of approximately 45° to the respective glass plates 8 and they are in alinement with lenses 14 and 15, the lenses being mounted on lens boards 16 and 17 and the lens boards being connected to the front of the camera casing 2 by bellows 18 and 19. The lens boards are individually adjustable in the direction of the optical axes of the respective lenses, each lens board being mounted for this purpose to shift longitudinally on a pair of rails 20, the forward ends of which are supported by brackets 21 secured to the top of the table 1. A door 22 may be provided in the front wall of the compartment 3 to facilitate insertion and removal of a paper roll spool, and a door 23 may be provided in the top of the camera casing to facilitate threading of the end of a new spool or roll of paper over the rolls 6 and 7. Also, a door 24 may be hinged to the camera casing 2 to provide access to the mirrors to facilitate focusing of the lenses.

Preferably and as shown in the present instance, the machine embodies means for severing the exposed portions or sections of the photographic paper and for mechanically developing and fixing the exposed portions of the paper. For these purposes a severing device is provided below the glass plates 8, this severing device comprising a relatively fixed knife bar 25 and a cooperative relatively movable knife bar 26, these knife bars being separated while the paper is being fed downwardly from the space between the glass plates 8 and the knife bar 26 being moved toward the knife bar 25 to sever the paper strip at the proper point. The movable knife bar 26 may be actuated by rods 27 which are operatively connected to levers 28 on a rotatable shaft 29, the latter extending through the side of the casing 2 to the exterior thereof and being provided with a lever or handle 30 by means of which it may be actuated. The print developing and fixing means is located below the casing 2, it being preferably contained in a chamber 31 formed within a casing 32, the latter being mounted on the top of the table 1. The developing and fixing means comprises a developing tank 33 and a fixing tank 34, the developing tank 33 having a slot or opening 35 in its top through which the exposed portion of the photographic paper may be fed downwardly from the camera into the developing bath contained in the tank 33 when this tank is in the position shown in Figure 2. Means is provided for reciprocating the developing and fixing tanks 33 and 34 to effect transfer of the developed portion of the paper from the developing tank into the fixing tank. As shown, both tanks are mounted on a carriage 36 which is guided to reciprocate within the chamber 31 by rails 37 on which it travels, the carriage being provided with suitable means, such as a rack 38 and a cooperating pinion 39, for effecting its reciprocation. In the present instance, the pinion 39 is fixed to a shaft 40, this shaft extending to the front of the machine where it is provided with a crank or handle 41 for effecting its operation. By the construction described, after an exposed portion of the photographic paper has been fed into the developing bath and has remained therein for a sufficient period to effect its development, the handle 41 is operated to shift the developing and fixing tanks 33 and 34 toward the right in Figure 2, whereby the developed portion of the paper is withdrawn from the developing tank. The handle 30 is then operated to cause the knife bar 26 to sever the exposed and developed portion of the paper strip from the remainder thereof, in consequence of which the severed portion of the strip will drop into the fixing tank, wherein it is fixed by the fixing bath contained therein. A door 42 may be provided in the top of the casing 32 to afford access to the fixing tank 34 for the inspection or removal of the prints, and a door 43 may also be provided in the end of the casing 32 to permit removal of the developing and fixing tanks or trays for cleaning or other purposes.

The means provided by the present invention for supporting the objects or original copies to be photographed comprises a duplex copy holder which comprises individually movable sections whereby the pictures or reproductions obtained from the respective section of the copy holder through the respective lenses may be made of the proper size on the opposite sides of the paper. Preferably and as shown in the present instance, the duplex copy holder comprises a pair of supports 44 and 45 which are located in alinement with the respective lenses 14 and 15, these supports being provided in the present instance with frames 46 and 47 having glasses 48 and 49 fitted therein and against which the original copies may be held in flat form. The copy supports are mounted on bases 50 and 51, these bases being mounted to slide longitudinally on tracks 52 and 53 which extend lengthwise of the top of the table 1. The bases of the copy supports carry nuts 54 and 55 which cooperate with the respective screws 56 and 57, these screws being mounted rotatably on the top of the table and extending lengthwise thereof and provided with handles 58 and 59 at the front of the machine which may be conveniently operated by the attendant to adjust the copy holders in unison or individually in a direction toward the camera, thereby adjusting the sizes of the images of the original copies on the copy holders, as these images are projected on to the opposite sides of the strip of photographic paper lying in the focal plane and between the glass plates 8. The lens boards 16 and 17 are also capable of individual adjustment to properly focus the images on the sensitized strip according to the positions occupied by the respective copy holders.

In using a camera or photographic machine constructed as hereinbefore described, a roll of photographic paper or other material sensitized on both sides is placed in the compartment 3 and the end thereof engages the rollers 6 and 7 and thence passes downwardly into the focal plane of the camera which lies between the glass plates 8. The original copies to be photographed are placed on the respective copy holders 44 and 45, the copy holders are adjusted and the lenses are focused to produce images of the desired size or sizes on the respective sides of the photographic paper. The exposures may then be made by the use of shutters such as those commonly used in connection with ordinary camera lenses. After the exposures have been made, the photographic paper is fed to carry the exposed section thereof into the developing bath in the tank 35 and to bring a fresh portion of the paper into the field of exposure, the carriage 36 is shifted to withdraw the exposed and developed portion of the paper from the developing bath after the paper has been subjected for the proper length of time to the developing operation and the knife is operated to sever the exposed and developed portion of the paper, this severed portion of the paper then dropping into the fixing tank.

By providing a duplex copy holder the sections of which are individually adjustable in the directions of the optical axes of the respective lenses 14 and 15, the operator is enabled to obtain reproductions of any desired sizes on the opposite sides of the photographic paper, and moreover, reproductions of the same size on opposite sides of the paper obtained from originals of varying sizes. The individually adjustable lenses enable the images of the originals to be focused properly on the respective sides of the paper to conform with the different positions into which the sections of the copy holder may be adjusted. It is to be understood that the camera or machine may be used as an enlarging machine, as well as for the purpose of making photographic reproductions or original copies.

I claim as my invention:—

1. In a photographic apparatus, the combination of means for supporting a sheet of photographic material sensitized on both sides, means including a pair of lenses projecting images on to the respective sides of such photographic material, and a copy holder comprising sections individually movable in the direction of the optical axes of the respective lenses and adapted to support originals to be photographed in front of the respective lenses.

2. In a photographic camera and similar apparatus, the combination of means for supporting a sheet of photographic material sensitized on both sides, a duplex copy holder embodying sections individually movable in a direction toward and from said sheet supporting means, each section being adapted to support an original to be photographed, and means including lenses for the respective copy holder sections, operative to direct images of the originals thereof onto the respective sides of the photographic material positioned by said supporting means, said lenses being individually movable relatively to the respective copy holder section and sheet supporting means for separately focusing the images of the originals on the respective copy holder sections.

3. In a photographic camera or similar apparatus, the combination of a pair of copy holder sections individually movable in paths arranged one beside the other, a pair of lenses alined with the respective copy holder sections means for positioning a sheet of photographic material sensitized on both sides, and means cooperative with the lenses for projecting images of objects on the copy holder sections onto the respective sides of the photographic sheet.

4. In a photographic camera or similar apparatus, the combination of means for positioning a sheet of photographic material sensitized on both sides, angularly-arranged reflectors located respectively at opposite sides of the sheet positioning means, a pair of lenses alined respectively with said reflectors and individually movable toward and from the respective reflectors, and copy holder sections alined respectively with said lenses and individually movable in a direction toward and from the respective reflectors.

5. In a photographic camera or similar apparatus, the combination of a table having thereon a casing containing means for positioning a sheet of photographic material sensitized on both sides, means in said casing for feeding such photographic sheet to said positioning means, angularly-arranged reflectors at opposite sides of said sheet positioning means, and a pair of copy holder sections alined respectively with the lenses and individually movable on the table in the directions of the optical axes of the respective lenses.

In testimony whereof I have hereunto set my hand.

ARTHUR W. CAPS.